United States Patent

Shteyn et al.

Patent Number: 6,163,817
Date of Patent: Dec. 19, 2000

[54] DYNAMICALLY DISABLING AND ENABLING OF DEVICES IN CONSUMER SYSTEM WITH MULTIPLE COMMUNICATION PROTOCOLS

[75] Inventors: Yevgeniy Eugene Shteyn, Cupertino; Gregory Gewickey, Morgan Hill, both of Calif.

[73] Assignee: U.S. Philips Corporation, New York, N.Y.

[21] Appl. No.: 09/107,525

[22] Filed: Jun. 30, 1998

[51] Int. Cl.[7] .............................. G06F 13/00; G06F 9/45
[52] U.S. Cl. .................................... 710/8; 710/8; 710/11; 713/1; 713/100
[58] Field of Search ................................... 710/8, 36, 49, 710/104, 261, 10, 11; 709/227, 230; 713/1, 100

[56] References Cited

U.S. PATENT DOCUMENTS

| | | |
|---|---|---|
| 5,297,262 | 3/1994 | Cox et al. ................................... 710/36 |
| 5,408,607 | 4/1995 | Nishikawa et al. ...................... 709/218 |
| 5,692,219 | 11/1997 | Chan et al. ................................. 710/49 |
| 5,778,393 | 7/1998 | Blea et al. ................................ 707/205 |
| 5,787,259 | 7/1998 | Haroun et al. ........................... 709/253 |
| 5,938,757 | 8/1999 | Bertsch .................................... 712/36 |
| 5,959,536 | 9/1999 | Chambers et al. ...................... 340/636 |
| 5,978,860 | 11/1999 | Chan et al. ................................. 710/8 |
| 6,003,065 | 12/1999 | Yan et al. ................................. 709/201 |

*Primary Examiner*—Thomas C. Lee
*Assistant Examiner*—Chun Cao
*Attorney, Agent, or Firm*—Peter Verdonk

[57] ABSTRACT

An information processing system has first and second electronic sub-systems, and control means for controlling the sub-systems. At least the first sub-system has a software representation registered with the control means. The control means changes a state of the first sub-system through interacting with the software representation. The first and second sub-systems are also capable of interacting directly with one another without the control means being involved. To avoid conflicts, at least the first sub-system is capable of de-registering with the control means so as to functionally disable its software representation at the control means.

5 Claims, 3 Drawing Sheets

DYNAMICALLY DISABLING AND ENABLING OF DEVICES IN CONSUMER SYSTEM WITH MULTIPLE COMMUNICATION PROTOCOLS

FIELD OF THE INVENTION

The invention relates to a information processing system with distributed functionalities. The invention relates in particular, but not exclusively, to home theater equipment.

BACKGROUND ART

The consumer electronics industry is experiencing a major shift as entertainment systems move from the analog domain into the digital domain. Audio has moved into the digital domain with, e.g., compact disks and digital compact cassettes. Video will move into the digital domain rapidly within the next years. An all-digital multimedia system with digital audio and digital video opens up new possibilities to the consumer, owing to impressive digital processing capabilities that are becoming available for affordable prices. To mention a few of the new possibilities: real time video processing has come within reach of consumer apparatus; user control relies more and more on the system's intelligence, thus rendering the system much simpler to operate and relieving the user from monitoring the system; multiple digital resources are going to be interrelated and integrated within a single home system.

Integration of an ever increasing number of possibly interacting functionalities into a single system can be made attractive to both the consumer and the manufacturer if the system design supports distribution of the system's functionalities, scalability of the architecture, and closed-loop control. A system with distributed functionalities is failure tolerant in the sense that a hardware failure in one of the systems components need not affect the others. Functionality distribution also supports scalability. An architecture is scalable, or open, if it allows conflict-free reconfiguring, upgrading or extending of the system. By adding or removing functionalities as needed to match the demands, the manufacturer or the user can optimize system performance while minimizing costs. Closed-loop control means that a component, responding to a stimulus from another component or from the user, confirms receipt of the stimulus. In this manner, the system as a whole can keep track of the status of each of its components.

U.S. Pat. No. 5,959,536 relates to a control system that comprises multiple electronics devices, or sub-systems, and control means coupled to the sub-systems for controlling the interaction among the sub-systems. The control means acts on respective software representations of each respective one of the consumer sub-systems by local execution. By encapsulating the variable complexity of the task of the sub-system within a software representation, it can be made as simple or as sophisticated as needed to bring the capabilities up to a common level. Since the level of interface is common to the sub-systems, software applications executed at the control means can uniformly manipulate sub-systems which embody very different levels of sophistication. The sub-systems interact with and via the control means using a Messaging protocol that notifies the control means of a change of state of the sender of the message. Keeping track of the state changes is essential to the control means for performing the control function. The Messaging relies on the sub-systems having registered with the control means in order to make their presence known and in order to make their attributes available as represented by the respective software representations.

OBJECT OF THE INVENTION

The system described in aforesaid U.S. Pat. No. 5,959,536 relies on the Messaging system for interaction among the sub-systems. The inventors have asked themselves the question how the versatility of the system could be increased if the sub-systems were allowed to interact via a proprietary protocol in a peer-to-peer fashion, i.e., without the control means being involved. However, a conflict regarding control or resources is likely to occur if the control means attempts to access a sub-system that is communicating with another sub-system using the proprietary protocol and is executing commands within this proprietary environment. Since the control means has not been informed about state changes taking place during this peer-to-peer interaction, the control means has no information about the current state of the sub-system involved.

One of the solutions could be to block incoming control signals or commands issued by the control means when the relevant sub-systems are operating in a peer-to-peer fashion. The drawback of this solution is that special blocking hardware or software is required that increases the complexity of the system. In addition, his solution is not scaleable if there are more than two different peer-to-peer protocols available.

It is therefore an object of the invention to provide an information processing system that avoids conflicts in the peer-to-peer interaction mode. It is another object to retain the system's scalability.

SUMMARY OF THE INVENTION

To this end, the invention provides an information processing system that comprises first and second electronic sub-systems and control means for controlling at least the first sub-system. At least the first sub-system has a software representation registered with the control means. The control means is capable of changing a state of the first sub-system through interacting with the software representation. For example, a software application running on the control means uses state information of the first sub-system. The software representation comprises an abstraction of the sub-system for representing the respective sub-system at a semantic level common to the representations of the sub-systems controlled through respective software representations. The first and second sub-systems are capable of interacting directly with one another exclusive of the control means, using a proprietary peer-to-peer protocol. At least the first sub-system is capable of being de-registered with the control means so as to functionally disable its software representation at the control means.

In the system of the invention, the first sub-system is de-registered with the control means before interacting with the second sub-system and is registered again when the interaction has been completed. Accordingly, control conflicts or resource conflicts are avoided: the control means cannot access the first sub-system when the latter is communicating with the second sub-system using a proprietary protocol. Upon registering again with the control means the first sub-system may provide its current state information as part of its software representation.

Registering and de-registering of the first sub-system is achieved by, for example, having the first sub-system uploading its software representation to the control means and having the software representation deleted at the control means when appropriate. Alternatively, or subsidiarily, the control means has already installed the respective software representations, and the relevant sub-system or the control means itself enables or disables access to the sub-system's software representation, e.g., through a toggle bit or another enable/disable message.

Thus, the invention provides a solution to the problems stated above that allows to use different communication protocols both between control means and the first sub-system and between the first and second sub-systems in the same information processing system. This is achieved by means of dynamically connecting or disconnecting the first sub-system to or from the control means through functionally enabling or disabling its software representation from being accessed by the application run on the control means.

BRIEF DESCRIPTION OF THE DRAWINGS

The invention is explained by way of example and with reference to the accompanying drawings, wherein.

Throughout the figures, same reference numerals indicate similar or corresponding features.

PREFERRED EMBODIMENTS

Figure 1:
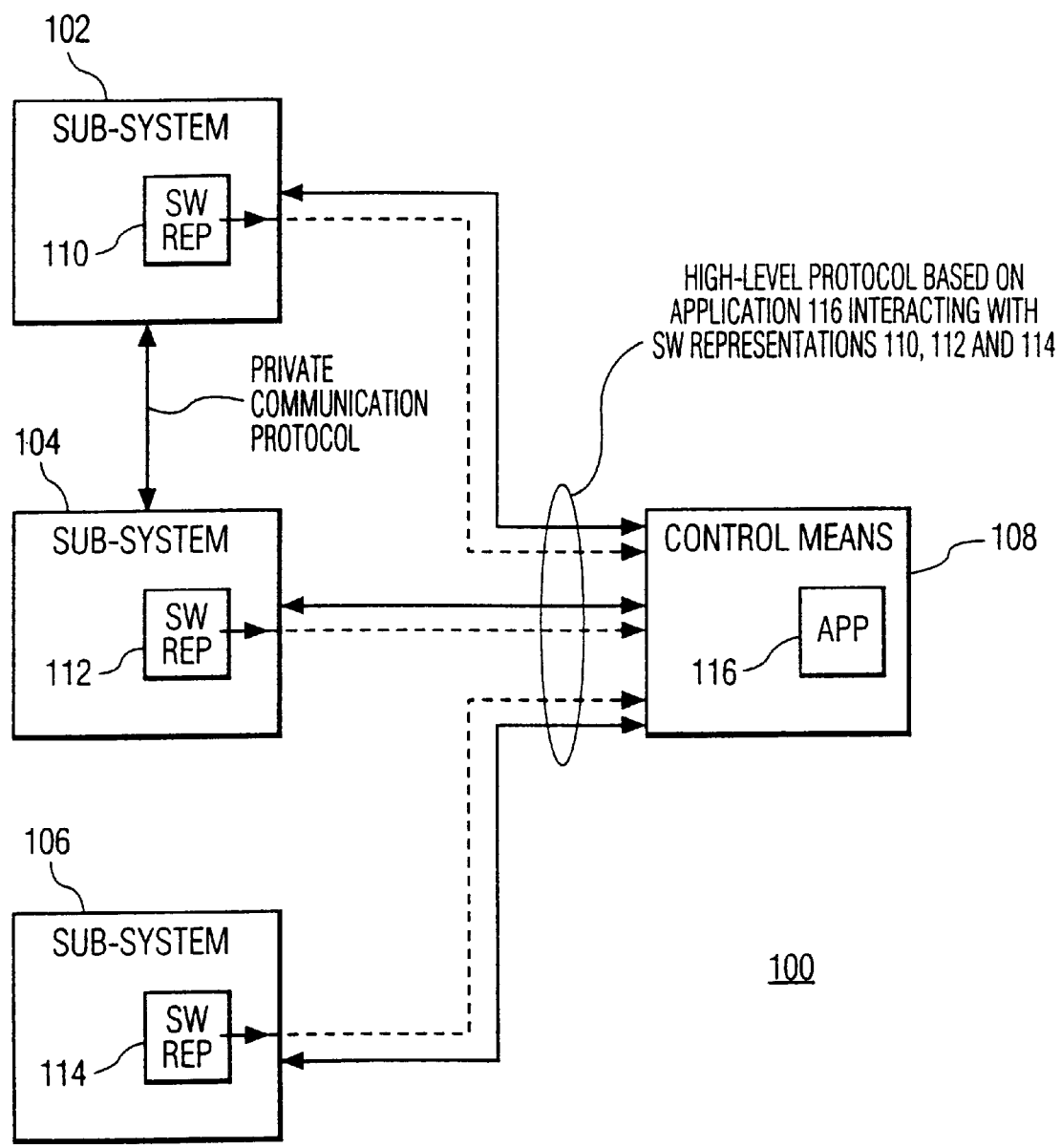
FIG. 1 is a block diagram of an information processing system in the invention.

FIG. 1 is block diagram of an information processing system 100 in the invention. System 100 comprises a first electronic sub-system 102, a second electronic sub-system 104, a third electronic subsystem 106 and control means 108. Control means 108 controls operation of sub-systems 102–106. Sub-systems 102–106 are capable of registering themselves with control means 106. By means of registering, systems 102–106 make available to control means 106 respective software representations, 110, 112 and 114 of themselves by, e.g., uploading (Java) bytecode. Alternatively, control means has installed respective software representations 110–114 and the relevant one of the sub-systems 102–106 merely disables or enables access of control means 108 to it. A software representation of system 102 comprises, for example, information to enable creating an appropriate GUI on a display at another one of sub-systems 104–106 or on control means 108. Control means 108 interacts with the software representations through a software application 116 running locally at control means 106. These interactions with control means 108 may cause systems 102–106 to change their respective states. A state change is reported back to control means 106, e.g., directly or upon request from control means 106. Sub-systems 102 and 104 are also capable of interacting directly with one another without control means 108 being involved, using a private peer-to-peer protocol 118 and their private communication means. Before this peer-to-peer communication takes place, sub-system 102 and 104 can be de-registered with control means 108 so as to have their software representations functionally withdrawn. De-registering can be initiated by sub-systems 102 and 104 themselves or by control means 108 or a special watchdog (not shown). This dynamic withdrawal avoids conflicts that occur when control means 108 attempts to access sub-system 102 or 104, i.e., through their software representations, when sub-systems 102 and 104 are already communicating or are executing commands within their proprietary context. Since the peer-to-peer interaction is private, control means 108 is not being informed about the state changes that occur in sub-systems 102 and 104 and thus may have incorrect information.

More sub-systems can be connected to control means 108 but are not shown in order to not obscure the drawing. Not all of the sub-systems connected to control means 108 may have the uploadable software representation and some may be of a less sophisticated configuration than others.

In a home theater environment, sub-systems 102–106 each comprise, for example, any of a one or more display devices, one or more VCR's, one or more TV tuners, one or more radio tuners, one or more audio amplifiers, one or more a DVD players, a CD jukebox, a digital video camera, a home security system, etc. Alternatively, sub-systems 102–106 each comprise a respective cluster of such pieces of equipment, e.g., organized according to the location of these devices, such as the associated room or building. The devices forming the cluster are interconnected to operate as a coordinated entity. Control means 108 comprises, for example, a PC or a DVX8000 Multimedia home theater of Philips Electronics, or even a server providing service to, e.g., a neighborhood, hotel or building complex.

The application running on control means 108 enables sub-systems 102–106 to cooperate in a coordinated and fully automated manner through their software representations. This is further explained in U.S. Pat. No. 5,959,536 mentioned above and herein incorporated by reference. For example, a particular user has specified in advance when and where he/she wants what particular kind of music to be played, e.g., after dinner he/she wants to listen to classical music in his/her garage or hobby room on Tuesday nights because that is the time he or she is working on his/her hobby (e.g., restoring a vintage automobile, painting in water colors or writing a novel) in that particular location and prefers that kind of music on that occasion. The application running on control means 108 selects from the available audio sources the desired content or the nearest equivalent, controls the routing of the audio data to the specific location and controls the local audio output equipment for play-out, all through the software representations of the resources interacting with the application. Selection is achieved, e.g., through a priority schedule, that enables scanning the current radio broadcasts for particular labels (e.g., through an electronic program guide) indicating classical music being on the air, or selecting from the user's music CD library a specific CD or track according to a selection algorithm (e.g., a specific composer, a specific style, at random, using user-profiling, or a combination thereof, etc). Thus, system 100 is task driven in the sense that the task is translated into actions to control the available equipment through scripting. On a particular Tuesday, a friend of the user is stopping by and brings the latest hard-rock CD with him to listen to it when the user and the friend are working on rebuilding the engine of the vintage automobile. The user now plugs the CD in the player in the garage and presses "play". The player and the speakers in the garage are initially connected to system 100. Upon the CD-player being activated, the player and the speakers are being de-registered with control means 108 and communicate with each other without the control means being involved, e.g., through USB. Upon de-registering with system 100, the application is prevented from accessing the player and speakers or interfering with the data stream. This frees network bandwidth and resources in system 100, e.g., for other users interacting with system 100. When the CD player in the garage is stopped again, this status information is sent to control means 108 or retrieved by control means 108 through a repeated polling procedure, or the user may provide input to the system, in order for system 100 to restore the "Tuesday night" default setting. Accordingly, de-registering may occur upon user-input that overrides the system's default setting at that moment.

As another example, consider a home entertainment system 100 with a home security sub-system 102 being controlled through control means 108. A user accesses system 100 from outside, e.g., through a remote server, to use other resources of system 100, e.g., to download files into sub-system 106 via the Internet from a remote location. Security sub-system 102 uses sub-system 106, e.g., to store video information about movements detected at the premises. Security system 102 must not be hampered and is notified to de-register with control means 108 in order to make available computing power and network bandwidth. Sub-system 102 now communicates the video information to a separate cache (not shown). Upon the files being downloaded, sub-system 102 is notified and is registered with control means 108 again, possibly with an updated state and transfers the video information from its cache to sub-system 106.

As still another example, system 100 only provides limited bandwidth and compute power to sub-systems 102–106 connected to control means 108. A priority schedule specified in advance determines which of resources 102–106 have to de-register and communicate among themselves using a proprietary protocol, in order to make available resources, compute power and bandwidth to tasks with a higher priority. This de-registering may be triggered by one of sub-systems 102–106 upon starting the higher priority task, or through the application running at control means 108, or through a user-input.

As yet another example, consider a home entertainment system 100 with multiple display devices 102 and 104 and a TV tuner 106. Control means 108 comprises a DVX8000 that has a built-in TV tuner (not shown). System 100 receives broadcasted information from various TV channels. Display at multiple display devices 102–104 at the same time is controlled via an application running on control means 108 and interacting through the software representations of devices 102–104. Assume that it is desirable that certain content of certain channels accessible through the DVX8000 built-in tuner not be displayed at display device 104. Control means 108 therefore has display device 104 and tuner 106 de-registered with control means 108 under these circumstances. Display device 104 now has only access to particular channels via tuner 106 that communicates with device 104 without control means 108 being involved. Content detection is done through, e.g., an EPG or suitable agent software residing at control means 108.

Figure 2:
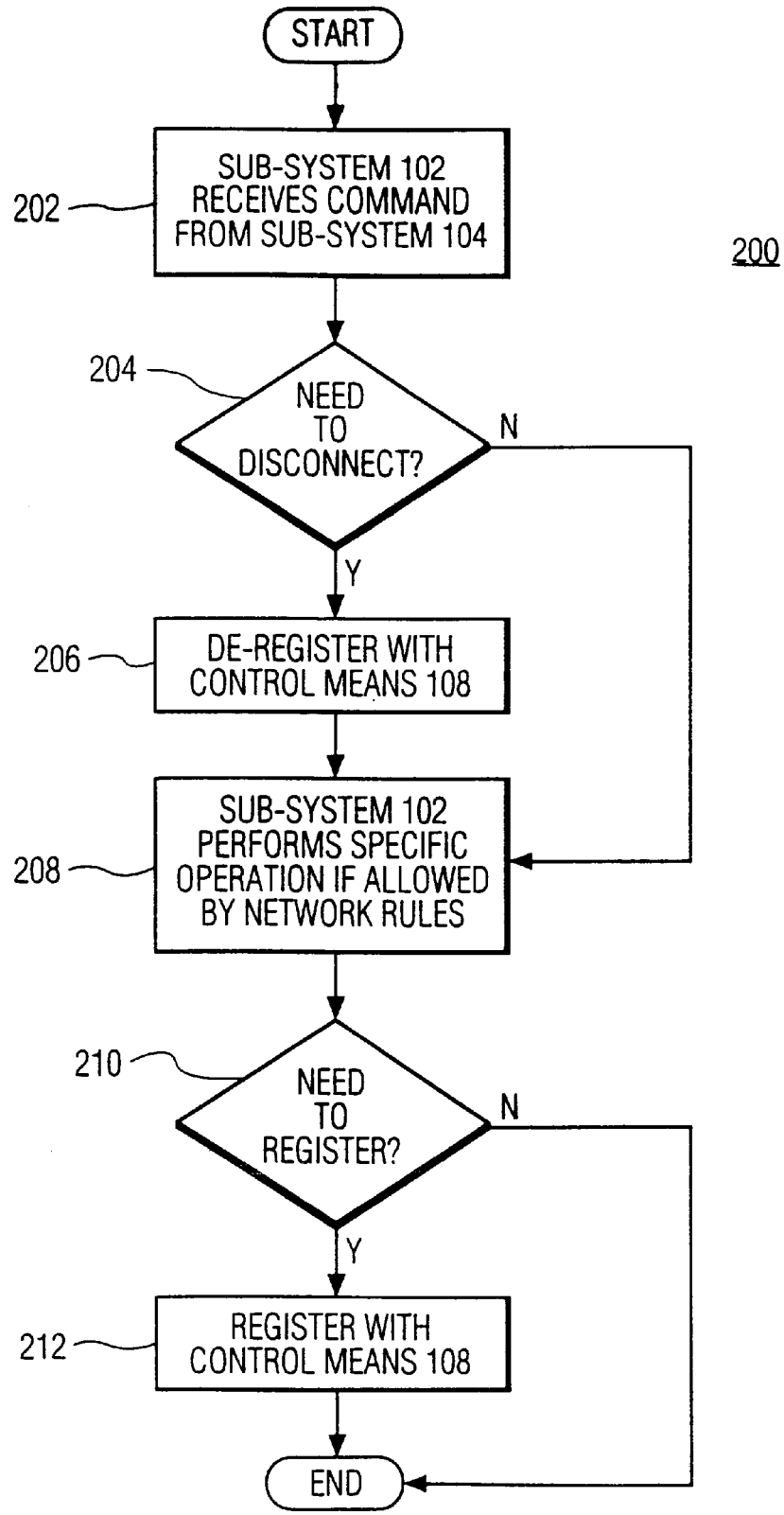
FIGS. 2 and 3 are flow diagrams illustrating the disconnect and reconnect procedure.

FIG. 2 is a flow diagram 200 illustrating the (de-) registering process in system 100. In step 202, sub-system 102 receives a specific signal, command or request directly from sub-system 104. In step 204, system 100 determines whether or not it is necessary that sub-system 102 is de-registered with control means 108. The determining can be done by, e.g., control means 108 or sub-system 102 itself. For example, if sub-system 104 merely requests status information from sub-system 102, and the latter provides this status information to sub-system 104, this interaction does not give rise to state changes in sub-system 102. In this case there is no need for sub-system 102 to de-register with control means 108, and the process goes to step 208, wherein sub-system 102 performs the operation requested. If, however, sub-system 104 requests an operation to be performed by sub-system 102 that causes the latter to undergo a state change, sub-system 102 de-registers with control means 108 in step 206. Upon completion of the operation in step 208, sub-system 102 determines if it is necessary to register with control means 108 again in step 210. If sub-system 102 was not de-registered, for step 206 was bypassed, there is no need to register again. The process is then complete and sub-system 102 is ready for a next event. If sub-system 102 has de-registered with control means 108, it now is registered in step 212 so that it is ready for a next event. Alternatively, the user may have to explicitly request sub-system 102 to register with control means 108 in step 212. This may be the case, for example, when an action by the user initiates a process that causes sub-system 102 to be de-registered.

Sub-systems 102–106 can be disconnect from, or de-registered with, control means 108 and the rest of the information processing network independently of one another such as under the scenario explained with regard to flow diagram 200. Alternatively, sub-systems 102–106 are disconnected in a coordinated manner. This is the case when, for example, sub-system 102 initiates the disconnecting process by sending messages to its peers 104 and 106. In this manner, a specific one of sub-systems 104 and 106 may be disconnected from control means 108 before a specific peer-command is received. The specific implementation of the algorithm resides on, e.g., sub-system 102 or can be part of the software representation of any of sub-systems 102–106 that is uploaded upon registering.

System 100 described above thus accommodates multiple communication protocols at the same time while using a dynamic registering protocol to avoid conflicts.

System 100 also provides for more efficient use in a multi-user environment, where each user can access certain parts of the network (network resources 102–106) without interfering with the interaction of the other users with system 100.

The same approach can be applied to a combination of multiple-content sub-systems, or sub-networks. For example, instead of a complete disconnect/connect procedure as described with reference to FIG. 2, system 100 can permit certain reservations made by one or more specific users. That is, the user can manipulate a UI module in the software representation of one or more of sub-systems 102–106, functionally connected to control means 108, for scheduling/configuration purposes without directing any output to the disconnected one(s) of the sub-system(s).

Figure 3:
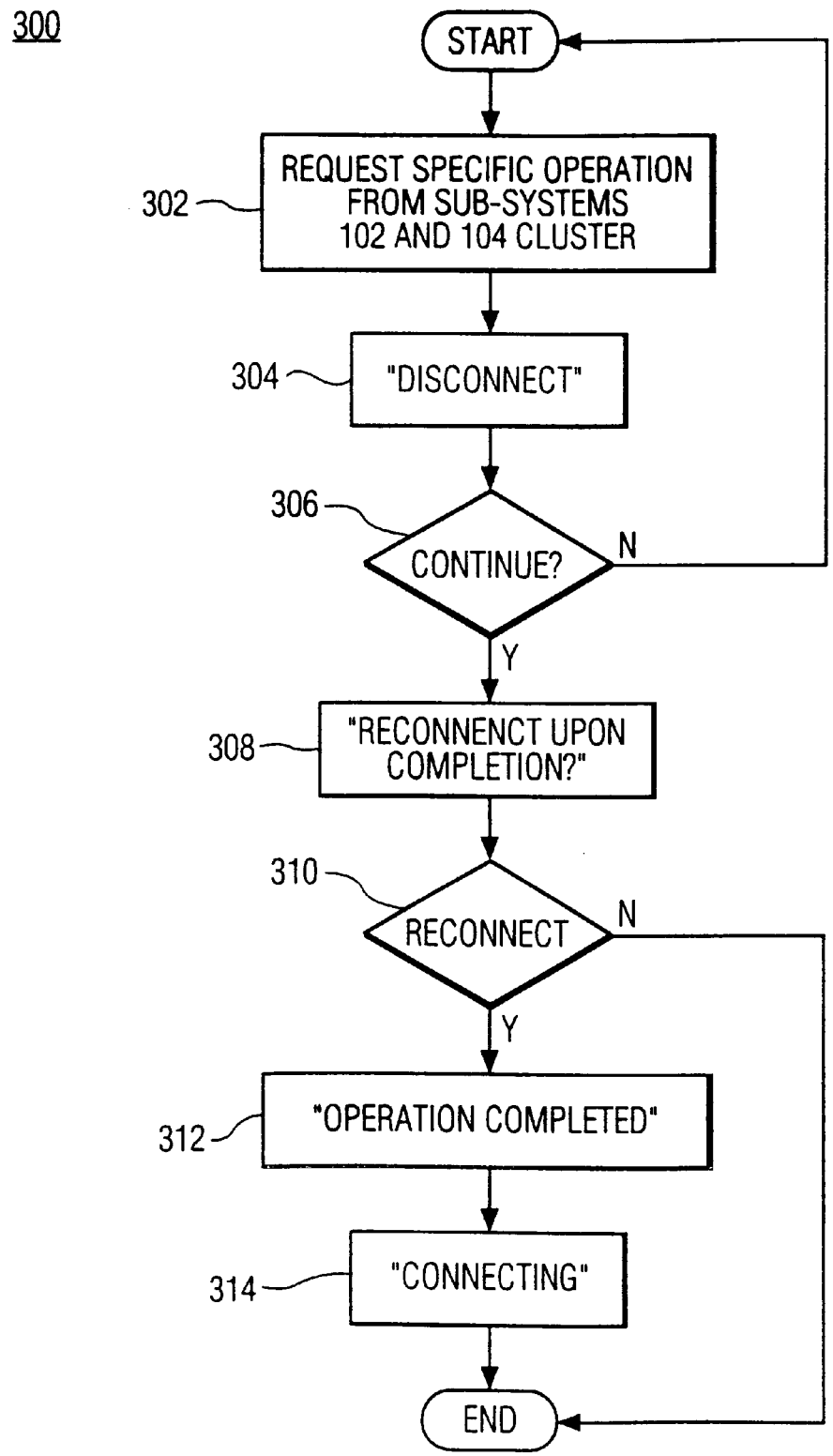

FIG. 3 is another flow diagram 300 showing in more detail the (de-) registering procedure upon a user interaction with system 100. In step 302, the user requests a specific operation from sub-system 102, e.g, cooperation between a digital video camera 102 with a display of VCR 104 connected to camera 102. For example, the user presses a button "PLAY" of camera 102. In step 304, the user gets a warning from system 100 or sub-system 102 in the form of a displayed comment: "disconnecting from the network" on the LCD (not shown) of sub-system 102, or on the display (not shown) of control system 108, or an auditory message such as a voice synthesized remark or a simple beep. The user may confirm receipt and approve of the disconnecting or may overrule the disconnecting in step 306. In the latter case the process may return to a step preceding step 302. In step 308, a message is being displayed "Sub-system 102 being disconnected from network. Do you want to have camera 102 (and VCR 104) reconnected to the network of system 100 upon completion of the operation?". The default answer in step 310 to this question is "yes". Camera 12 and VCR 104 are disconnected from network 100 by means of de-registering with control means 108. In step 312, camera 102 and the display of VCR 104 cooperate in a peer-to-peer fashion and the images are being displayed on the latter's display. For the duration of the cooperation, camera 102 and VCR 104 are not controllable through control means 108.

Control means 108 may get status information from devices 102–104 but cannot interfere with their respective states. Upon completion of the operation, a message is displayed in step 312 confirming the successful completion. In step 314, a message is displayed saying that camera 102 and VCR 104 are being reconnected to the network of system 100. Steps 304, 306, 308, and 312 are optional in this example.

We claim:

1. An information processing system comprising first and second electronic sub-systems, and control means for controlling at least the first sub-system, wherein:

at least the first sub-system is capable of having a software representation registered with the control means;

the control means is capable of changing a state of the first sub-system by interacting with the software representation;

the first and second sub-systems are capable of interacting directly with one another to change the state of the first sub-system exclusive of the control means; and at least the first sub-system is capable of being de-registered with the control means so as to have its software representation functionally disabled at the control means in order to make the first sub-system available for a state change to be made through direct interaction with the second sub-system exclusive of the control system.

2. The system of claim 1, wherein:

when a command is given to the first sub-system, the system automatically determines if de-registering of the first sub-system is required based on the command;

if de-registering is required, the first sub-system is automatically de-registered and executes the command;

if de-registering is not required, the first sub-system remains registered and executes the command.

3. The system of claim 2, wherein:

the system automatically determines whether it is required to have the first sub-system registered again with the control means upon the first sub-system being de-registered and having executed the command, and the system automatically enables registering again of the first sub-system if required for enabling the control means to interact again with the software representation of the first sub-system.

4. The system of claim 1, wherein at least the first sub-system is capable of uploading its respective software representation to the control means.

5. A method of enabling control of an information processing system, the system comprising first and second electronic sub-systems, and control means for controlling at least the first sub-system, the method comprising:

enabling at least the first sub-system to be registered with the control means for making available a software representation of the first sub-system to the control means;

enabling the control means to interact with the software representation for changing a state of the first sub-system;

enabling the first and second sub-systems to interact directly with one another to change the state of the first sub-system exclusive of the control means; and enabling at least the first sub-system to be de-registered with the control means so as to have its software representation functionally disabled at the control means in order to enable the direct interaction between the first and second sub-system to change the state of the first sub-system without involvement of the control system.

* * * * *